United States Patent [19]

Kottke

[11] 4,288,171

[45] Sep. 8, 1981

[54] MOUNT FOR A HOLDING STRUCTURE OF A FREE-CUTTING DEVICE

[75] Inventor: Joachim Kottke, Remseck, Fed. Rep. of Germany

[73] Assignee: Andreas Stihl, Waiblingen, Fed. Rep. of Germany

[21] Appl. No.: 882,434

[22] Filed: Mar. 1, 1978

[30] Foreign Application Priority Data

Mar. 2, 1977 [DE] Fed. Rep. of Germany ... 7706436[U]

[51] Int. Cl.³ .............................................. F16B 7/00
[52] U.S. Cl. .................................... 403/218; 403/389
[58] Field of Search ............... 403/389, 390, 391, 396, 403/400, 218

[56] References Cited

U.S. PATENT DOCUMENTS 82,738 10/1868 Moorehead ................... 403/391 X
2,018,539 10/1935 Welsh ................................ 403/218

FOREIGN PATENT DOCUMENTS 310747 1/1956 Switzerland ........................ 403/218
339647 8/1959 Switzerland ........................ 403/391

Primary Examiner—Andrew V. Kundrat
Attorney, Agent, or Firm—Becker & Becker, Inc.

[57] ABSTRACT

A mount for a holding structure of a free-cutting device having two clamping members which respectively include a depression for receiving a mount member of the holding structure, while at least one of the clamping members is provided with a receiving surface extending transverse to the depression for receiving a supporting tube of the free-cutting device. The at least one of the clamping members is provided with screw bolts guided in passages of the two clamping members by means of which the mount portion for the holding structure is clamped fast between the two clamping members. The receiving part for the supporting tube and the depressions for the mounting part for the supporting tube are located at different heights. The depressions confine at least partly a passage which extends over the entire length of the two clamping parts for the bearing part. At least four screw bolts are provided which received in pairs are located on both sides of the receiving surface in said clamping pieces, while the openings have thread-free passages for the screw bolts.

23 Claims, 8 Drawing Figures

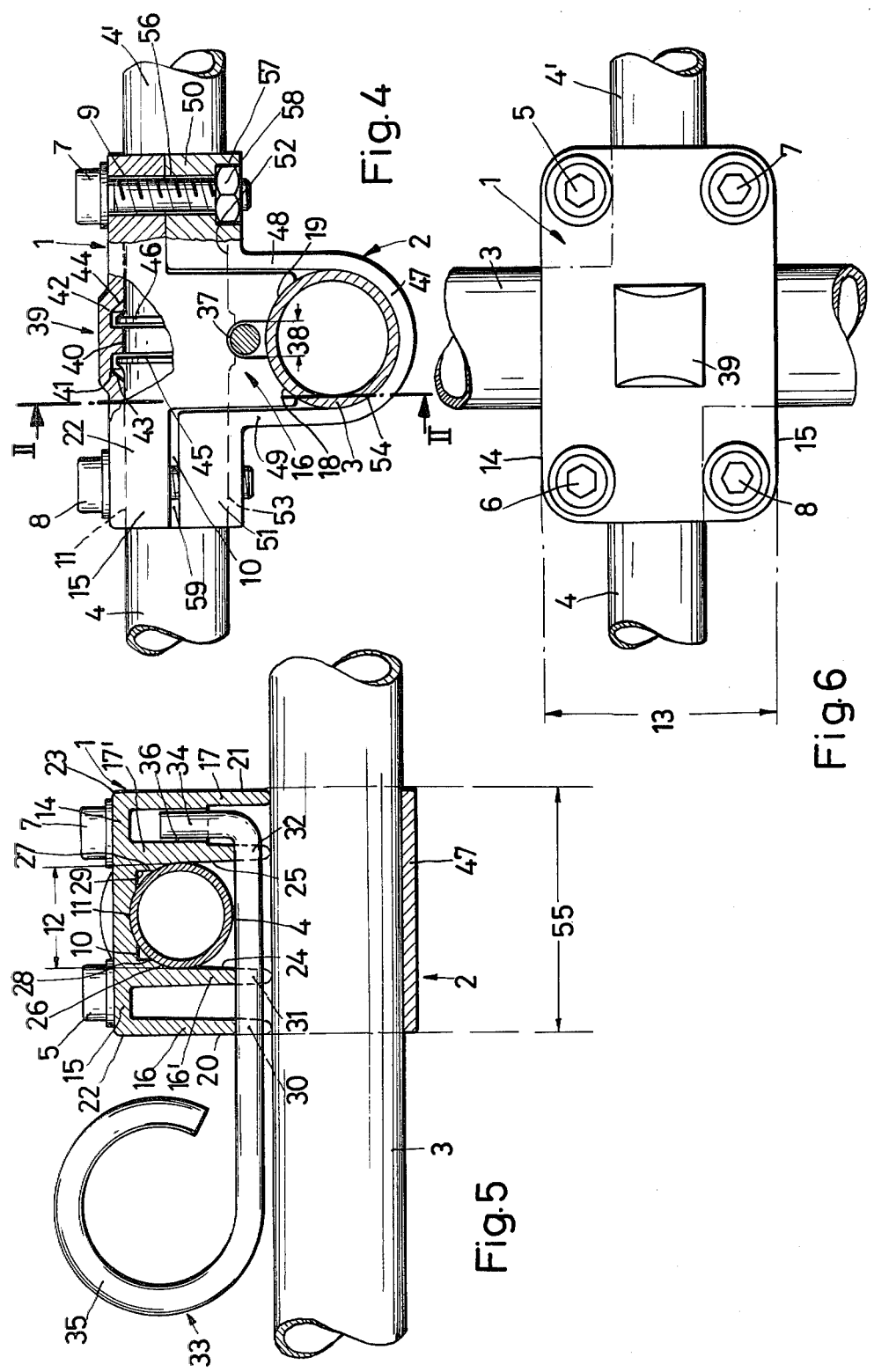

MOUNT FOR A HOLDING STRUCTURE OF A FREE-CUTTING DEVICE

The present invention relates to a mount for a holding structure of a free cutting device with two clamping members each of which has a depression for receiving a bearing portion of the holding structure. Of the said two clamping members, one clamping member is provided with a receiving element which is located transverse to said depression, for a supporting tube of the free cutting device, and is furthermore provided with screws which are guided in the openings of the two clamping members. By means of these screws, a bearing portion of the holding structure is clamped firmly between the two clamping members.

With the heretofore known holding structure of the above mentioned type, the openings for the screws are threaded bores. The clamping members therefore following their manufacture have to be machined, which necessitates work and time. The two clamping members are in the form of a clip and surround the supporting tube. One end is extended and has depressions for receiving the holding structure. The supporting tube and the holding structure are by means of screws firmly clamped between the two clamping members. If the necessity of adjusting the holding structure arises, the screws have to be loosened. In this connection, however, also the supporting tube and the holding structure are released so that the holding structure cannot be adjusted independently of the supporting tube. When adjusting the holding structure or the supporting tube, it is, therefore at any rate necessary also to effect a corresponding new adjustment of the supporting tube and the holding structure. During an operation, this is rather awkward and requires unnecessary time. By means of the two clamping members, it is possible to clamp fast only one holding structure with a single holding tube, and with only one handle. It is not possible between the two clamping members to connect a holding tube with two handles which extends transverse to said supporting tube. With such supporting tube, a simpler handling of the free cutting device is possible than would be permitted with a handling tube which has a single handle only.

It is, therefore, an object of the present invention to provide a holding structure of the above mentioned general type in such a way that the two clamping members without the necessity of being machined will be able to receive the holding structure and the supporting tube so that both can be adjusted independently of each other.

These and other objects and advantages of the present invention will appear more clearly from the following specification in connection with the accompanying drawing, in which:

FIGS. 1, 2 and 3 show a free cutting device in side view in transporting position, in top view in operative position, and in side view in operative position respectively.

FIG. 4 represents a side view and partial section of the holding structure according to the present invention.

FIG. 5 is a section taken along the line V—V of FIG. 4.

FIG. 6 is a top view of the mount according to FIG. 4.

Figures 1, 2, 3:
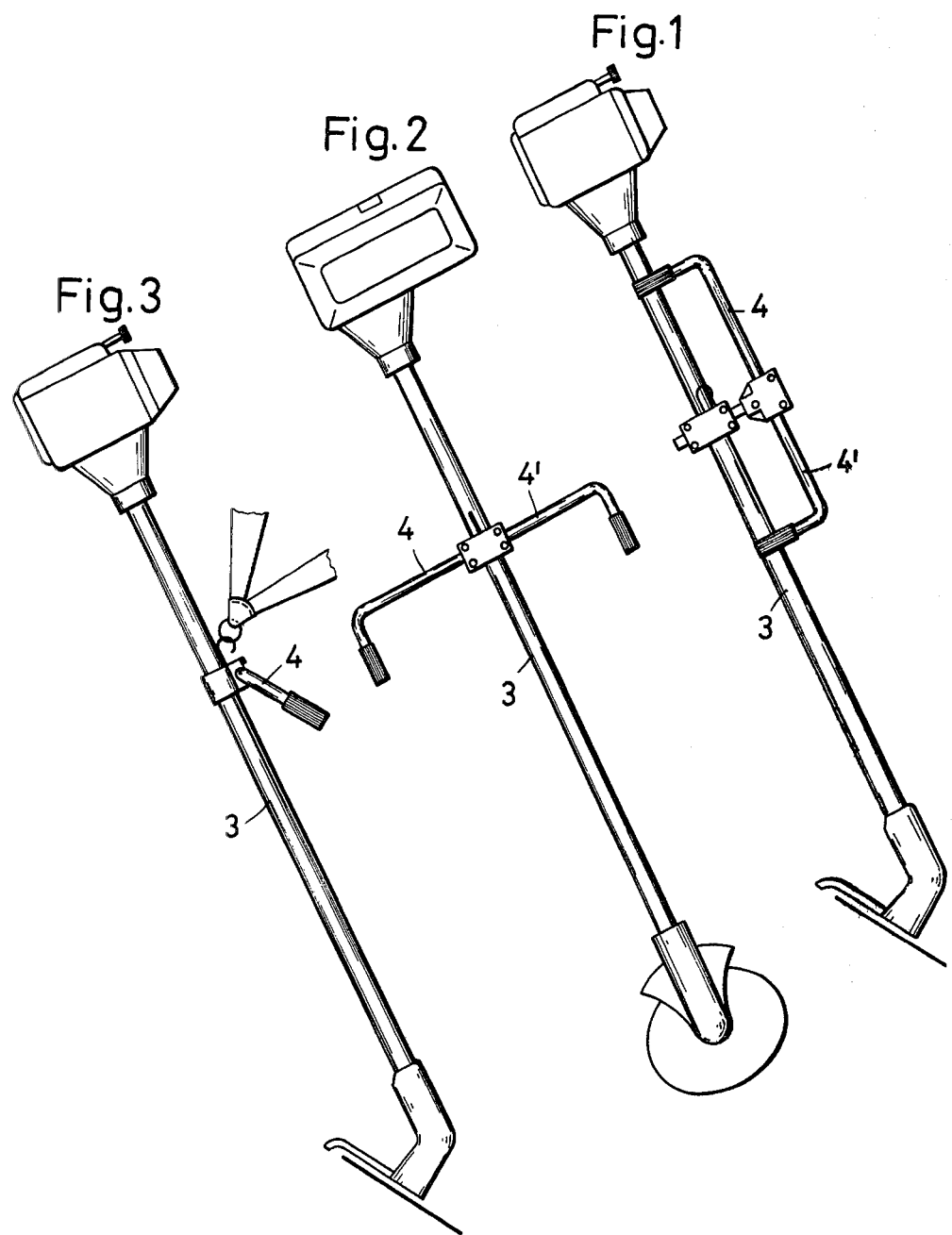
FIGS. 1, 2 and 3 represent an overall view of a free cutting device with a mount for a holding structure according to the present invention and more specifically.

The above outlined object according to the present invention has been realized primarily by the fact that the receiving surfaces for the supporting tube and the depressions for the mounting part are located at different levels and that the depressions at least partially confine a passage for the mounting part which passage extends over the entire length of the two clamping members. Furthermore, at least four screws are provided which in pairs are located on both sides of the receiving surface and of the depressions in the clamping members. The passages are thread-free bores for the screws.

In view of the above design according to the invention, the clamping members need not be post machined because the openings for the screws form passages through which the bolts can pass. Therefore, the clamping members can preferably be designed and manufactured as cast pieces which need no further post machining. By means of the two clamping members, the supporting pipe or tube and the holding structure can be clamped fast to such an extent that these two clamping members can be adjusted or set independently. To this end, the screws which are located diagonally opposite or cater-cornered to each other are loosened so that the mounting part or the handle tube can be adjusted to the desired position.

Two other screws likewise arranged diagonally opposite to each other will during their adjustment respectively hold the handle tube and the mounting part of the holding structure so that they will retain their position with regard to the mount. As a result thereof, a simple adjustment will be assured. With the holding structure according to the invention, due to the passage extending all the way through, a handle pipe or tube with two handles can be utilized which with its mounting part is mounted in the passage opening and on both sides projects from the holding structure. However, two part handling pipes can be utilized which are introduced respectively from both ends into the passage. These two handle tubes can be adjusted independently of each other merely by loosening one of the screws or bolts located in the clamping region of the respective handle tube. The remaining three screws hold the other handle tube and the carrying pipe firmly in their adjusted position. The handle structure can in this way in an optimum manner be adapted to the operator for the free cutting device.

Referring now to the drawings in detail, the mount according to FIGS. 4-6 comprises two clamping members 1 and 2 between which a supporting tube 3 and a tubular bearing or handle member 4 of a holding structure are firmly clamped by means of four screws 5,6 7 and 8.

The clamping member 1 is plate-shaped and has a rectangular contour. Within the region of the rounded corners of the clamping member 1 there are provided bore-shaped passages 9 for passing screws 5 to 8 therethrough. The passages 9 have a constant diameter over their entire length.

On the bottom side 10 of the clamping member 1 which bottom side faces the clamping member 2, there is provided a depression 11 which extends over the entire length of the clamping member 1. In the said depression 11 there is provided a preferably tubular bearing or handle member 4. The width 12 of the depression 11 is less than the width 13 (FIG. 6) of the clamping member 1.

On the rim sections or longitudinal edges 14 and 15 of the clamping member 1 on both sides of the depression 11, there are respectively provided two clamping legs 16, 16' and 17, 17' which approximately at right angles project from the bottom side 10 of the clamping member 1. The four clamping legs have substantially the same dimension and form a single integral piece with the clamping member 1. As will be evident from FIG. 4, the supporting tube 3 is clamped fast by the clamping legs.

The clamping legs extend transversely with regard to each other while the width of said clamping legs corresponds to about ⅓ of the length of the clamping member 1 (FIG. 4). The free ends 18, 19 of the clamping legs are adapted to the outer shape of the supporting tube 3 so that a major surface of the clamping legs engage the supporting tube 3. As a result thereof, the supporting tube is safely clamped fast. Inasmuch as furthermore the supporting tube 3 in the region of the clamping member 1 in view of the four is clamping legs 16, 16', 17,17' clamped fast at four spots spaced from each other, an extremely safe holding of the supporting tube 3 in the mount is assured.

The clamping legs taper in the direction toward the free ends so that within the region of the free ends of the clamping legs high clamping forces can be conveyed to the supporting tube. The outer surfaces 20 and 21 of those clamping legs 16 and 17 of the two pairs of clamping legs which face away from each other, are located in one plane with the pertaining outer surface 22, 23 of the clamping member 1 so that at the merging area from the clamping legs to the clamping member 1, no edges are formed.

The inner surface 24 and 25 of the two inner clamping legs 16' and 17' are over the major portion of their length are located in one plane. Within the region of the bottom side 10 of the clamping member 1, the inner surface 24, 25 merges with a surface section 26, 27 which is located on an imaginary cylinder mantle and which adjoins at an obtuse angle surface sections 28, 29 located in one plane. The two surface sections 28, 29 are parallel to each other whereas the two inner surfaces 24, 25 are located in planes which converge in the direction toward the bottom side of the clamping member 1. The surface sections 28,29 respectively adjoin at a right angle the bottom side 10 of the clamping member 1. The depression 11 is likewise located on the mantle of an imaginary cylinder. As shown in FIG. 4, the curved surface sections 26, 27 of the two inner clamping legs 16', 17', and the depression 11 are located on a common cylinder mantle. The tubular bearing or handle member 4 of the holding structure has a circular cross section and has such a diameter that its outer surface area engages surface sections 26,27 of the two clamping lega 16', 17' and also engages the bottom of the depression 11 as shown in FIG. 5. As a result thereof, the tubular bearing or handle member 4 is safely held in clamping position. The distance between the two surface sections 26, 27 of the two inner clamping legs 16', 17' is greater than the width of the depression 11.

At about half the width, the clamping legs 16, 16' and 17' respectively have a groove 30, 31 and 32 through which a device 33 can be inserted for a non-illustrated supporting strap. The suspension device 33 is hook-shaped one end 34 bent off at a right angle while its other end is bent to form a loop 35. The loop 35 has circular cross section and its end 34 engages a receiving opening 36 formed by the legs 17, 17'.

The preferably tubular bearing or handle member 4 in view of its circular cross section can be turned by 360° so that the holding structure can be set in an infinitely variable manner to its different positions. Inasmuch as the surface sections 28,29 adjoin the bottom side 10 of the clamping member 1 at a right angle, between the two clamping legs 16', 17' also a bearing member of rectangular cross section could be arranged instead of the tubular bearing or handle member. In such an instance, the corner shaped or rectangular bearing or handle member will engage the bottom side 10 of the clamping member and will also engage the straight surface sections 28, 29 which extend perpendicular to said bottom side 10 and respectively pertain to the inner two clamping legs 16', 17'.

Inasmuch as in the outer clamping leg 17 there is not provided any groove, the hook end 34 of the suspension device 33 is projected toward the outside. The bottom 37 of the grooves 30-32 is curved in conformity with the contour of the suspension device so that the suspension device along its groove surface engages the cruve bottom 37 and in this way is safely supported. The width 38 of the grooves 30-32 corresponds to the diameter of the suspension device 33. The two longitudinal edges or rim sections 14, 15 of the clamping member 1 in the regions which in the longitudinal direction adjoin the clamping legs, are angled off at a right angle (FIG. 4) in the direction toward the clamping member 2. The height of the angled off longitudinal rim sections is greater than the thickness of the clamping member 1 but is shorter by at least half the height of the clamping leg. At about half the length, the clamping member 1 has an elevation 39 which is arranged in the center of the clamping member 1 (FIG. 6). At the bottom side of this elevation, there is provided a web 40 which extends into the region between the two clamping legs 16', 17' and separates the two grooves 41, 42 from each other; these grooves extend over the entire width of the depression 11. The web 40 has a rectangular cross section, and the lateral surfaces of the web 14 form one side wall of the two grooves 41, 42. The other side walls 43, 44 of the two grooves diverge in the direction toward the clamping legs and merge at an obtuse angle with the bottom side 10 of the clamping member 1. The grooves 41, 42 serve for an axial safeguarding when by means of the mounting, as shown in FIG. 1, two bearing or handle members 4, 4' are to be fastened. In such an instance, the bearing or handle members 4,4' have their free ends provided with a collar 45, 46 of increased diameter by means of which they engage the grooves. The web 40 which extends along a circular arc transverse to the longitudinal direction of the clamping member 1 projects to such an extent that when utilizing a one-piece handle tube the web engages the outer surface of the bearing or handle member so that the latter will be clamped fast also within the region of the elevation 39.

The clamping member 2 is substantially U-shaped and has a web 47 located on an imaginary cylinder mantle. The web 47 merges with straight legs 48 and 49 which diverge in the direction toward the clamping member. The free ends 50 and 51 of the two legs are angled off outwardly at a right angle. In the two free ends 50, 51 there is respectively provided a depression 52, 53 expediently having the same width as the depression 11 in the clamping member 1. In order that the free ends 50,51 have a sufficient strength, they are considerably thicker than the legs 48, 49 and the web 47. The two depressions 52, 53 engage along the entire surface the bearing or handle member 4,4' so that the bearing or handle member will be properly held. The web 47 is curved in such a way that entirely along its surface the web 47 engages the supporting tube 3. As will be seen from FIG. 4, the inner surfaces 54 of the web 47 and the free ends 18, 19 of the clamping legs 16, 16', 17, 17' are located on a common imaginary cylinder mantle so that the supporting tube 3 over nearly its entire circumference engages the clamping legs and the web.

The distance between the two legs 48, 49 is slightly greater than the width of the clamping legs 16, 16', 17, 17', so that said clamping legs can simply be inserted between the two clamping legs. As shown in FIG. 5, the length 55 of the legs 48, 49 corresponds to the distance between the outer surfaces 20, 21 of the two outer clamping legs 16 and 17. As a result thereof, these outer surfaces are located in a plane with the end faces of the legs 48, 49 so that the mount is compact. The circumference or contour of the free ends 50, 51 corresponds to the contour of the clamping member 1 so that, as shown in FIG. 6, the two clamping members 1 and 2 when viewed from the top cover each other.

Within the region of the rounded off corners of the free ends 50, 51, there is respectively provided a passage 56 for the screws 5-8. These passages widen at that end thereof which faces away from the clamping member 1 into a widened portion 57 which serves for receiving a nut 58. The screws 5-8 are, as will be seen from FIG. 6, arranged in pairs on one side each of the supporting tube 3 and of the bearing or handle member 4, 4'. The two clamping members 1 and 2 within the region of the screws 5-8 are firmly screwed to each other. The difference in tolerance between the supporting tube 3 and the clamping members 1 and 2 is bridged or compensated for by the elastic deformation of the clamping members. The supporting tube 3 is clamped fast by means of the diagonally oppositely located screws 5 and 8. By means of the other two diagonally arranged screws 6 and 7, the clamping of the bearing or handle member 4, 4' is effected through the intervention of a clamping gap 59 between the two clamping members 1 and 2. Within the region of the screws 6 and 7, the two clamping members 1 and 2 cooperatively engage each other in surface-to-surface relationship (FIG. 4). The screws 5-8 which are expediently designed as hollow screws merely have to be passed through the passages 9-56 in the two clamping members and have to be screwed into the non-rotatable nuts 58 in the broadened section 57. Inasmuch as the openings are designed as passages, no thread has to be provided in said passages whereby the clamping members 1 and 2 can be produced as simple cast elements.

When utilizing a one-piece bearing or handle member, which is located in the passage of the mount formed by the two depressions 11, 52, 53, the screws 6 and 7 are loosened to permit adjustment of the bearing or handle member. As a result thereof, the bearing or handle member 4 can be turned in the passage, whereas the two other screws 5 and 8 take over the securing of the mount with regard to the supporting tube 3.

If a two-part handle member or handle tube is utilized, both sections 4, 4' of which are clamped fast in the mount, these handle members can be adjusted individually. In such an instance, it is merely necessary to loosen the one screw which is located in the clamping region of the pertaining bearing or handle member 4,4' so that the respective bearing or handle member can be adjusted independently of the supporting tube 3 and of the other bearing or handle member. The tolerances between the bearing or handle member and the clamping members 1,2 can be bridged or compensated for by the elastic deformation of the clamping members. Inasmuch as the screws 5-8 are arranged in the corner regions of the clamping members it is possible in view of the relatively long lever arms, to exert a high clamping force by means of which the bearing or handle member 4,4' can be properly clamped fast.

The two clamping members 1 and 2 can be pivoted about the axis of the supporting tube 3 when the respective screws 5-8 have been loosened, whereby an additional adjusting possibility for the holding structure is provided.

Figure 7:
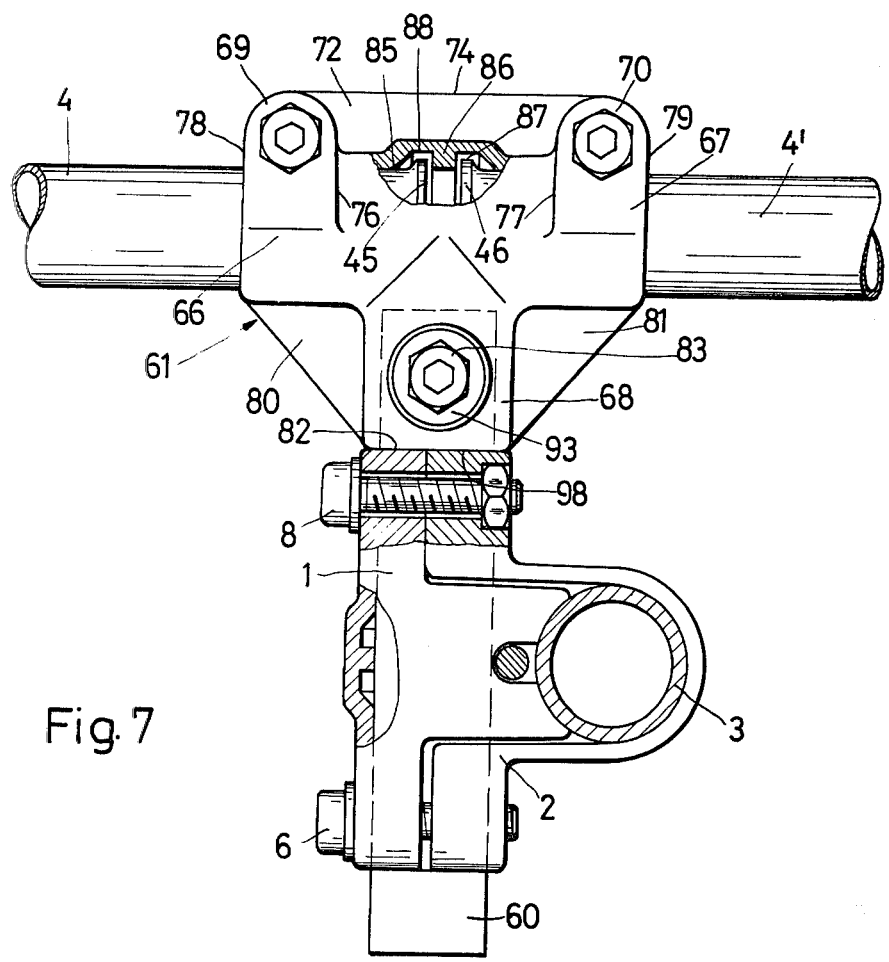
FIG. 7 is a view and partial section of a second embodiment of a mount according to the invention.
Figure 8:
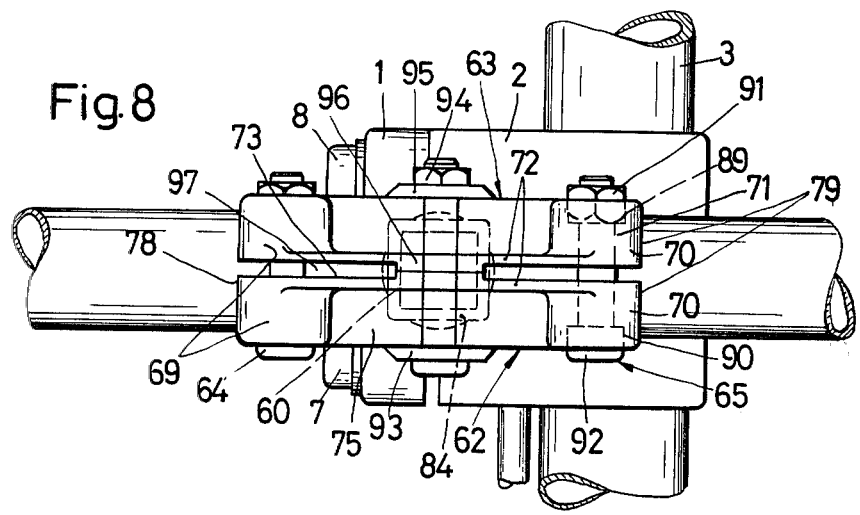
FIG. 8 is a top view of the mount shown in FIG. 7.

Referring now to the embodiment of FIGS. 7 and 8, it will be noted that between the two clamping members 1 and 2 there is fastened a connecting member 60 which has a circular or angular cross section and is displaceable in its longitudinal direction. The connecting mmber 60 which is located in the passage of the mount interconnects the mount with a pivoting device 61 for the handle structure. The pivoting device comprises two equally designed clamping jaws 62 and 63 which can be clamped together by means of screws 64 and 65. The clamping jaws 62 and 63 in view have a T-shape whereby a compact design of the pivoting device is obtained.

The ends of the T-legs 66,67 are provided with parallel projections 69, 70 which are directed opposite to the T-foot section 68 while the top side of the projections 69, 70 is rounded off in a semi-circular manner. Passage 71 for the screws 64, 65 are provided in the projections 69,70 within the region of the free ends of the T-legs 66,67. The two projections 69,70 of each clamping jaw are interconnected by a narrow rib or fin 72 the inner surface 73 of which is located in a plane with the pertaining inner surface of the clamping jaws 62, 63. As shown in FIG. 7, the upper rim of rib 72 merges with the highest spot of the projections 69,70.

The rib 72 merges approximately at a right angle with the top side 75 of the clamping jaws, the width of which when viewed in top view is considerably greater than the thickness of the rib 72.

The top side 75 is curved from the rib 72 in the direction toward the T-foot portion 68. The inner surfaces 76,77 of the two projections 69, 70 are parallel to each other and over a major portion of their height are located in planes which are parallel to each other. As a result thereof, a step is formed between these inner surfaces 76,77 and the top side 75 of the clamping jaws. Those outer surfaces 78,79 of the projections 69,70 which face away from each other, extend parallel to each other and to the inner surfaces 76,77 and form the front or outer surfaces of the two clamping jaws 62,63.

In the two T-legs 66,67 and in the two T-foot portions 68 of the clamping jaws there is respectively provided a depression which in conformity with the cross section of the bearing or handle members 4,4' to be inserted are so designed that they cooperatively engage in surface-to-surface relationship with said bearing or handle member in a way similar to that described above for the clamping members 1 and 2 of FIGS. 4-6. Between the T-foot portion 68 and the two T-legs 66,67, there is respectively provided a reinforcing rib 80,81 which is T-shaped. This reinforcing rib extends from the end 78, 79 of the two clamping jaws to the end face 82 of the T-foot portion 68.

In the T-foot portion 68 of the two clamping jaws 62,63 there is respectively provided a passage for a screw bolt 83 by means of which the two T-foot portions of the clamping jaws can be clamped to the connecting member 60. As shown in FIG. 8, the connecting member 60 has passage openings 84 for the screw 83.

At about half the length of the two clamping jaws, at the lower side 85, there are provided two grooves 87,88 which are separated from each other by a web 86. This arrangement serves as axial safety device for the bearing or handle members 4,4' which by means of their collar 45, 46 engage the grooves 87,88. The grooves 87,88 are provided in an elevated region of the clamping jaws and are of a design similar to that of the grooves 41,42 of the two clamping members 1 and 2.

The passages 71 in the projection 69,70 merge at those ends thereof which face away from each other, with a widened section 89,90. Of these widened portions, for instance the widened portion 89 serves for receiving a nut 91, and the widened portion 90 serves for receiving the head 92 of the screws 64,65. The nuts 91 are secured against accidental rotation in the widened portion. The screw 83 has its head, below which a washer 93 is provided, resting upon the outside of the T-foot portion 68 and is held in its respective position by means of a nut 94 below which there is likewise located a washer 95 and which nut engages the outside of the T-foot portion 68 of the oppositely located clamping jaw. In view of the design of the openings for the screws as passage openings, the clamping jaws can be produced as cast pieces which no longer have to be post machined.

The two clamping jaws at about half their length rest against each other by means of a thickened portion 96 of the ribs 72. Over the major portion of their length, said clamping jaws are however spaced from each other and form a clamping gap 97.

The two bearing or handle members 4,4' of the holding structure by way of screws 64,65 clamped fast between the two clamping jaws while differences in tolerance between the depression in the clamping jaws and the bearing or handle member are bridged or compensated for by an elastic deformation of the clamping jaws.

Inasmuch as the screws are arranged at the ends of the T-legs 66,67, it is possible in view of the relatively large lever arm to exert a high clamping force upon the members 4,4'. By loosening one of the screws 64,65, it is possible with a two-piece design of the handle member to adjust the respective handle member 4 or 4' individually. The respective other bearing or handle member is safely held in its adjusted position by the non-loosened screw. An adjustment with regard to the supporting tube 3 is not effected because the supporting tube by way of screws 5-8 is clamped between the two clamping members 1 and 2.

The holding structure together with the pivoting device 61 can be rotated about the axis of the connecting member 60 when the screws 6 and 7 located crosswise are loosened. In such an instance, the connecting member 60 when having a circular cross section within the passage opening of the two clamping members 1 and 2 can be turned about its longitudinal axis whereby the pivoting device 61 by means of the holding structure can be turned into the desired position. This adjustment is possible over an angle of 360°. Subsequently, the two screws 6 and 7 are again tightened. During the adjusting operation, the other two screws 5 and 8 hold fast the supporting tube 3. As a result thereof, an additional adjusting possibility is furnished.

For a safe support of the pivoting device 61, the pivoting device has an end face 82 of the T-foot portion 68 engage the wide side 98 of the two clamping members 1,2. The clamping jaws 62,63 which when viewed from the top are substantially rectangular are, in a space saving manner located over nearly the entire length within the circumference of the two clamping members 1,2 (FIG. 8). The width measured in top view of the two clamping jaws 62,63 is considerably less than the width of the clamping members 1,2. The clamping jaws and the clamping members have about the same length.

It is, of course, to be understood that the present invention is, by no means, limited to the specific showing in the drawings, but also comprises any modifications within the scope of the appended claims.

What I claim is:

1. A mount for a single holding structure of a free cutting device, comprising: only first and second clamping members which respectively are each provided with openings and depression-forming means and with cooperating clamping surfaces, a bearing or handle supporting tube member of the holding structure received between said first and second clamping members, at least one clamping member being provided with spacers and a receiving space located transverse to the depression-forming means and adapted to clampingly receive said supporting tube member of the free cutting device, screws guided in the openings of said clamping members and adapted to clamp said supporting tube member therewith between said clamping members, said receiving space for the supporting tube member and the depression-forming means at least partially confining a passage for said supporting tube member, said passage extending over the entire length of said clamping members, and at least four screws provided in pairs which are located on both sides of said receiving space and said depression-forming means in said clamping members, said passages being thread free passages for said screws.

2. A mount according to claim 1, in which one clamping member is substantially plate shaped and has that bottom side thereof which faces the other clamping member provided with one depression forming means which extends over the entire length of the clamping member.

3. A mount for a holding structure of a free cutting device, comprising: only first and second clamping members which respectively are each provided with openings and depression-forming means and with cooperating clamping surfaces, a bearing or handle supporting tube member of the holding structure received between said first and second clamping members, at least one clamping member being provided with a receiving space which is located transverse to the depression-forming means and is adapted to receive said supporting tube member of the free cutting device, screws guided in the openings of said clamping members and adapted to clamp said supporting tube member therewith between said clamping members, said receiving space for the supporting tube member and the depression-forming means for the bearing or handle supporting tube member being located at different levels, the depression forming means at least partially confining a passage for said supporting tube member, said passage extending over the entire length of said clamping members, and at least four screws provided in pairs which are located on both sides of said receiving space and said depression-forming means in said clamping members, said passages being thread free passages for said screws, one clamping member being substantially plate shaped and having that bottom side thereof which faces the other clamping member provided with one depression-forming means which extends over the entire length of the clamping member, the width of the one depression-forming means being less than the width of the plate-shaped clamping member, and on both sides of the depression-forming means at the bottom side at least one clamping leg being provided which projects at a right angle from the bottom side.

4. A mount for a holding structure of a free cutting device, comprising: only first and second clamping members which respectively are each provided with openings and depression-forming means and with cooperating clamping surfaces, a bearing or handle supporting tube member of the holding structure received between said first and second clamping members, at least one clamping member being provided with a receiving space which is located transverse to the depression-forming means and is adapted to receive said supporting tube member of the free cutting device, screws guided in the openings of said clamping members and adapted to clamp said supporting tube member therewith between said clamping members, said receiving space for the supporting tube member and the depression-forming means for the bearing or handle supporting tube member being located at different levels, the depression-forming means at least partially confining a passage for said supporting tube member, said passage extending over the entire length of said clamping members, and at least four screws provided in pairs which are located on both sides of said receiving space and said depression-forming means in said clamping members, said passages being thread free passages for said screws, the holding structure being pivotable relative to the supporting tube member, the holding structure being connected to a pivoting device which is adjustably connected to the two clamping members.

5. A mount according to claim 4, in which the other clamping member is substantially U-shaped, and that two legs havings free ends are angled off toward the outside in opposite direction with regard to each other.

6. A mount according to claim 5, characterized in that the depression forming means also are arranged in the free ends of the U-shaped clamping member.

7. A mount for a holding structure of a free cutting device, comprising: only first and second clamping members which respectively are each provided with openings and depression-forming means and with cooperating clamping surfaces, a bearing or handle supporting tube member of the holding structure received between said first and second clamping members, at least one clamping member being provided with a receiving space which is located transverse to the depression-forming means and is adapted to receive said supporting tube member of the free cutting device, screws guided in the openings of said clamping members and adapted to clamp said supporting tube member therewith between said clamping members, said receiving space for the supporting tube member and the depression-forming means for the bearing or handle supporting tube member being located at different levels, the depression-forming means at least partially confining a passage for said supporting tube member, said passage extending over the entire length of said clamping members, and at least four screws provided in pairs which are located on both sides of said receiving space and said depression-forming means in said clamping members, said passages being thread free passages for said screws, one clamping member being substantially plate shaped and having that bottom side thereof which faces the other clamping member provided with one depression-forming means which extends over the entire length of the clamping member, the other clamping member is substantially U-shaped, and that two legs having free ends are angled off toward the outside in opposite direction with regard to each other, the height of the legs of the U-shaped clamping member being greater than the height of the supporting tube member.

8. A mount according to claim 7, in which a step between the two legs of the U-shaped clamping member corresponds to the width of the legs of the plate shaped clamping member.

9. A mount according to claim 7, characterized in that the depression-forming means in the two clamping members have substantially the same width.

10. A mount according to claim 7, in which the passages for the screws respectively merge at least at one end with a widened receiving space for a nut.

11. A mount according to claim 7, in that the plate-shaped clamping member has a rectangular contour, and that the openings for the screws are provided in the corners of the clamping member.

12. A mount according to claim 7, in which the two clamping members are respectively and substantially symmetrically designed with regard to each other.

13. A mount according to claim 7, in which the clamping legs are provided with a centrally located groove for receiving a suspension device for a supporting strap.

14. A mount according to claim 7, in which said one plate-shaped clamping member is provided with safety means for preventing accidental distortion of the suspension device.

15. A mount according to claim 14, in which said safety device comprises a recess formed by legs opening at the bottom side of the plate-shaped clamping member, said suspension device having the form of a hook and being suspended in said recess.

16. A mount according to claim 15, in the clamping legs respectively comprise two identically embodied clamping leg sections which extend transverse to the longitudinal direction of the depression forming means while being spaced from each other, said two clamping leg sections providing the recess for said suspension device.

17. A mount according to claim 4, in which the pivoting device comprises two clamping jaws between which the handle supporting tube member of the holding structure is adapted to be clamped fast by means of said screws.

18. A mount according to claim 17, in which the two clamping jaws are substantially identically embodied and respectively comprise a depression forming means for receiving said handle member.

19. A mount according to claim 18, in which the clamping jaws have a T-shape, and that in a T-foot portion there is provided a further depression forming means which extends transverse thereto and is adapted to receive an adjusting member for the holding structure.

20. A mount according to claim 19, wherein the pivoting device has its T-foot portion engage an end face of the two clamping members.

21. A mount according to claim 4, in which at least one angled off free end of the other clamping member is located in spaced relation to said one clamping member in clamped position therewith.

22. A mount according to claim 1, in which the holding structure is pivotable relative to the supporting tube member.

23. A mount for a holding structure of a free cutting device, comprising: only first and second clamping members which respectively are each provided with openings and depression-forming means and with cooperating clamping surfaces, a bearing or handle supporting tube member of the holding structure received between said first and second clamping members, at least one clamping member being provided with a receiving space which is located transverse to the depression-forming means and is adapted to receive said supporting tube member of the free cutting device, screws guided in the openings of said clamping members and adapted to clamp said supporting tube member therewith between said clamping members, said receiving space for the supporting tube member and the depression-forming means for the bearing or handle supporting tube member being located at different levels, the depression forming means at least partially confining a passage for said supporting tube member, said passage extending over the entire length of said clamping members, and at least four screws provided in pairs which are located on both sides of said receiving space and said depression-forming means in said clamping members, said passages being thread free passages for said screws, one clamping member being substantialy plate shaped and having that bottom side thereof which faces the other clamping member provided with one depression-forming means which extends over the entire length of the clamping member, the width of the one depression-forming means being less than the width of the plate-shaped clamping member, and on both sides of the depression-forming means at the bottom side at least one clamping means being provided which projects in the direction of said receiving space and which is provided for clamping said supporting tube member in said receiving space.

* * * * *